（12） United States Patent
Fuenfschilling et al.

(10) Patent No.: US 6,801,272 B2
(45) Date of Patent: Oct. 5, 2004

(54) COLOR SWITCH (75) Inventors: Jürg Fuenfschilling, Basel (CH);
Martin Schadt, Seltisberg (CH)

(73) Assignee: Rolic AG, Zug (CH)

( * ) Notice: Subject to any disclaimer, the term of this patent is extended or adjusted under 35 U.S.C. 154(b) by 0 days.

(21) Appl. No.: 10/182,832

(22) PCT Filed: Jan. 30, 2001

(86) PCT No.: PCT/CH01/00068
§ 371 (c)(1),
(2), (4) Date: Aug. 2, 2002

(87) PCT Pub. No.: WO01/57587
PCT Pub. Date: Aug. 9, 2001

(65) Prior Publication Data
US 2003/0058387 A1 Mar. 27, 2003

(30) Foreign Application Priority Data
Feb. 3, 2000 (GB) ............................................. 0002546
May 15, 2000 (GB) ............................................. 0011698

(51) Int. Cl.[7] ............................................. G02F 1/1347
(52) U.S. Cl. ........................................ 349/78; 349/76
(58) Field of Search ..................................... 349/78, 76

(56) References Cited

U.S. PATENT DOCUMENTS

| 4,726,663 A | 2/1988 | Buzak |
| 5,528,393 A | 6/1996 | Sharp et al. |
| 5,619,355 A | 4/1997 | Sharp et al. |
| 5,686,931 A | 11/1997 | Fuenfschilling et al. |
| 5,822,021 A * | 10/1998 | Johnson et al. ............. 348/742 |
| 6,574,044 B1 * | 6/2003 | Sahouani et al. ........... 359/498 |

FOREIGN PATENT DOCUMENTS

| CN | 1132556 | 10/1996 |
| EP | 0 713 126 | 5/1996 |
| WO | WO 95/10065 | 4/1995 |

* cited by examiner

Primary Examiner—Dung T. Nguyen
Assistant Examiner—Timothy L Rude
(74) Attorney, Agent, or Firm—Finnegan, Henderson, Farabow, Garrett & Dunner, L.L.P.

(57) ABSTRACT

A color switch is provided for selectively switching between color bands for use, for example, in projection optics and direct view optics. The color switch has fewer and thinner layers than in the prior art, but exhibits equal or better color purity and light efficiency. The color switch or filter includes a first filter section for selectively blocking green light and including a cholesteric filter, a quarter wave plate and a liquid crystal switch. The color filter has a second filter section for selectively blocking blue and/or red light including a stack of retarder elements and liquid crystal switches, preferably Deformed Helical Ferroelectric (DHF) switches. The parameters of the filter are determined by an optimization process including minimizing a cost function (G) with respect to the parameters of the second filter section. A polarizing element may be positioned in front of the stack and may be of a type which does not absorb radiation.

21 Claims, 9 Drawing Sheets

COLOR SWITCH

This application is a national stage filing under 35 U.S.C. § 371 of International Application No. PCT/CH01/00068, filed on Jan. 30, 2001, which published in the English language. This application also claims the benefit of priority under 35 U.S.C. § 119(a) to GB Patent Application No. 0002546.0, filed on Feb. 3, 2000 and GB Patent Application No. 0011698.8, filed on May 15, 2000.

The present invention relates to a colour switch for selectively switching between different colour bands for use, for example, in projection optics and in direct view optics.

Colour switches based on retarders and liquid crystal (LC switches) are known and are shown for example in U.S. Pat. No. 5,528,393. They are however difficult to produce. To get the desired steep spectral transmission curves requires a large number of retarders, which are expensive to produce. Another approach is to use retarders in high order (thick retarders with a retardation $\Delta n \cdot d \geq 2\lambda$, where d is the thickness, $\Delta n$ the birefringence and $\lambda$ the wavelength of light). Since production variations of retarder thicknesses are usually proportional to the thickness, very tight tolerances are necessary to meet the required accuracy (which is typically ±50 nm).

Colour switches based on cholesteric filters and LC switches (stacked band modulation filters, BMFs) are shown for example in U.S. Pat. No. 4,726,663. These are less sensitive to manufacturing tolerances. The performance of these devices depends strongly on the birefringence $\Delta n$ of the liquid crystal polymer (LCP) material used to produce the cholesteric filters in the BMFs. The most elegant approach is the incorporation of high-$\Delta n$ materials ($\Delta n > 0.3$) into the filters, since then only 6 cholesteric layers (two for each colour) are required. However, cholesteric filters made from large $\Delta n$-materials exhibit strong side-lobes in their transmission spectra, reducing the overall transmission of the filter stack. Furthermore, high-$\Delta n$ materials tend to absorb more light, especially in the blue region of the spectrum, limiting the lifetime in high-light-intensity applications such as projection systems. If low-$\Delta n$ materials are used considerably more layers are required (e.g. for $\Delta n=0.12$, six times more layers are necessary: three times more to cover the spectral range; since low-$\Delta n$ materials also require much thicker layers, which cannot be produced in a single step, a further doubling of the layers results). A further drawback of stacked BMFs is their subtractive colour generation scheme: they divide the total spectrum in non-overlapping sub-spectra of the three primary colour R, G, B. While this leads to high colour purity, it is not the most light-efficient approach, because an overlap between 490 nm and 500 nm between the green and the blue spectra yields excellent colour saturation with significantly higher light throughput than non-overlapping configurations.

SUMMARY OF THE INVENTION

The concept of the invention is to employ a cholesteric filter (more generally chiral filter) to selectively block one of the primary colours, and optimised retarder combinations are used to block the remaining primary colours. Such an arrangement provides a colour switch with fewer and thinner layers than in the prior art, but which exhibits equal or better colour purity and light efficiency. Thus, the invention combines the good properties of cholesteric filters (sharp spectra) with the good properties of birefringent filters (higher brightness than purely subtractive filters). Fewer layers implies fewer manufacturing steps; thinner layers implies less tight manufacturing tolerances.

The present invention provides in a first aspect a colour filter for switching between three different colour bands characterised by the combination of a first filter section for selectively blocking a first colour band and a second filter section for selectively blocking second and third colour bands;

the first filter section including a chiral filter means for reflecting one circularly polarised state of the first colour band and transmitting the other circularly polarised state;

and the second filter section including a combination of a plurality of retarder elements and a plurality of electrically controlled liquid crystal switches, arranged so as to be switchable between a first state in which both the second and third colour bands are blocked, a second state in which the second colour band is blocked, and a third state in which the third colour band is blocked.

The filter comprises a stack of elements, and preferably the chiral filter comprising the first filter section is placed at the front of the stack for the incoming light beam. Whilst it may be placed at the back of the stack, this may cause a reduced switching contrast because light reflected from the chiral filter may be re-reflected with reversed polarisation by the filter sections in front of the cholesteric filter.

The second filter section might in principle be constructed as two sub-sections, each sub-section acting on a respective primary colour band. However, in accordance with the invention it is preferred to use as switches in the second section, deformed helical ferroelectric switches (DHF). These have various variable parameters such as voltage dependent birefringence and dispersion, cell gap, orientation of optical axis. In addition, optical retarders have various parameters which may be varied, for example birefringence and dispersion, thickness and orientation. It is preferred in accordance with the invention rather than designing the second filter section separately for respective primary colour bands, to optimise the properties of the various elements of the second filter section bearing in mind its various parameters. This confers significant advantages in terms of overall thinness of the colour switch and excellent filter properties (sharp spectra, high brightness).

Thus in a further aspect, the invention provides, for a colour filter for selectively switching first, second and third colour bands, and including a first filter section for selectively blocking a first colour band, and a second filter section for selectively blocking at least a second colour band, the first and second sections including a combination of a plurality of retarder elements and electro-optic elements, a method of optimising the characteristics of the colour filter comprising a. defining parameters of the elements of the first filter section to define the first colour band;

b. determining the variable parameters of the elements of the second filter section for optimisation;

c. minimising with respect to the parameters of the second filter section a cost function G:

$$G = \sum_{F=R,G,B} g_{1F}((x_F - x_{F0})^2 + (y_F - y_{F0})^2) + (g_{2F}(Y_F - Y_{F0}))^2$$

where $Y_F$ is brightness, and $x_F$, $y_F$ are the colour co-ordinates, $x_{F0}$, $y_{F0}$ and $Y_{F0}$ are respectively target values for colour co-ordinates, brightness and wherein the parameters g are weight coefficients, including adjusting recursively the weights g of such that after optimisation the terms in G are of generally similar magnitude.

In regard to the first filter section, a quarter wave plate is used to convert the circularly polarised light of the primary colour component to linearly polarised light, and a liquid crystal switch in combination with a polarising sheet is employed to selectively switch the primary colour component. The liquid crystal switch either rotates the optical axis (such as a DHF cell) or switches between birefringent and non-birefringent state (such as a Pi-cell).

It will often be advantageous to choose for the cholesteric filter a selective reflection band that lies inside the overall colour spectrum. For an RGB system for instance green, which lies between red and blue, may be chosen since the sharp edge of the cholesteric filter spectrum on both sides can be used.

A colour switch according to the invention can be used in projection optics and in direct view optics. The display may consist either of a single pixel or a multitude of pixels, or of a combination of a "single pixel" colour switch with a pixellated (grey-scale) display.

A problem arising in projection systems is that they must tolerate extremely high light intensities with no degradation. In this regard, the first filter section, including a polarising sheet is a potential problem since it absorbs radiation. It is therefore preferred to use a non-absorbing reflective polariser. Polarisation recovery schemes are known using non-absorbing polarisers that split unpolarised light into two beams of differently polarised light, and then transform the polarisation of one beam into the polarisation of the other and combine them to a single beam—see for example U.S. Pat. No. 5,235,443. However, such polarisers are relatively bulky and it is therefore preferable to position the polariser outside of the stack formed by the colour switch according to the invention.

In accordance with a further aspect of the invention, there is provided a chiral filter section in which the elements of the filter section are so organised that it is possible to place a polarising element of the filter section in a leading position to receive an incoming beam of light, with the remaining elements of the filter section following the polarising element and arranged in a stack.

Advantageously, the liquid crystal elements of the colour filter, that is chiral filter, retarders and switches, are aligned by a photo-orientation technique. Among the different known methods particularly well suited will be those using linear photopolymerisation (LLP), also sometimes referred to as photooriented polymer network (PPN). Backgrounds and manufacturing of such elements are disclosed in, for example, U.S. Pat. Nos. 5,389,698, 5,838,407, 5,602,661, EP-A-689084, EP-A-0756193, WO-A-99/49360, WO-A-99/64924, and WO-A-00/36463.

BRIEF DESCRIPTION OF THE DRAWINGS

Preferred embodiments of the invention will now be described with reference to the accompanying drawings wherein.

DESCRIPTION OF THE PREFERRED EMBODIMENTS

Figure 1:
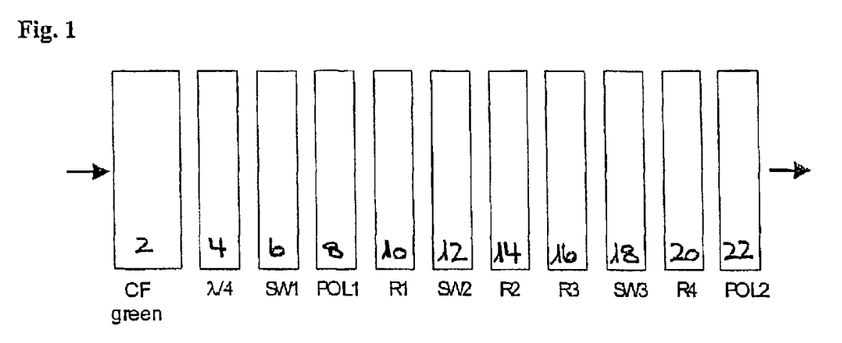
FIG. 1 is a schematic view of a first embodiment of the present invention.
Figure 6:
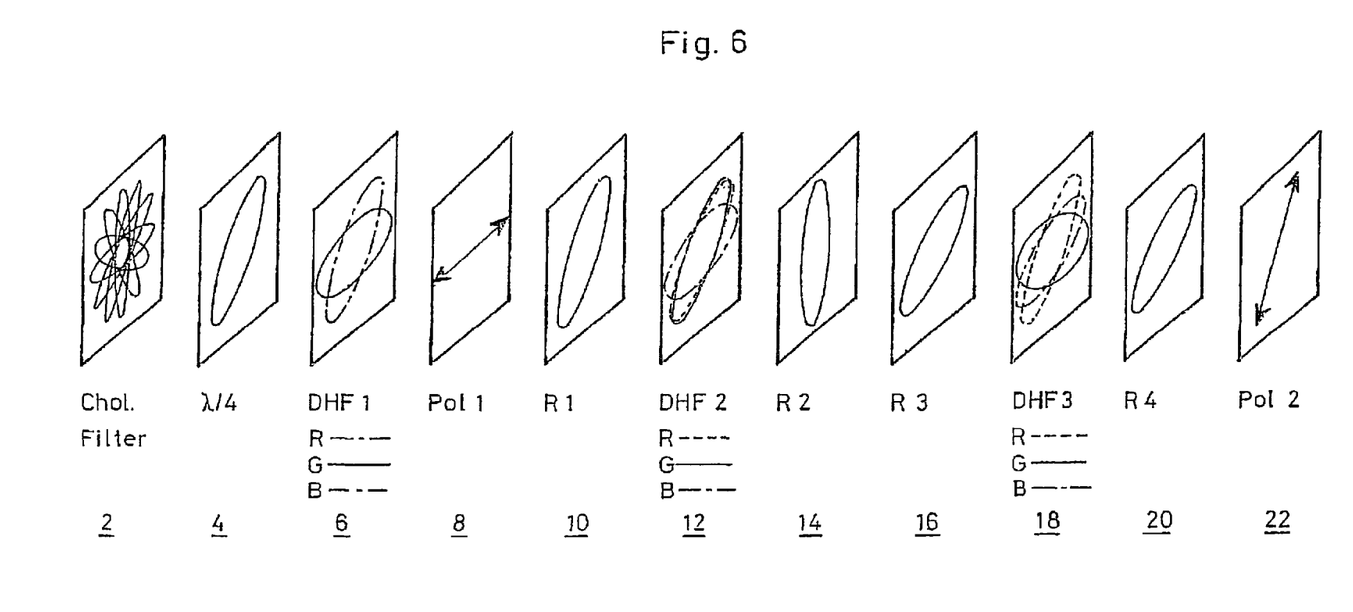
FIG. 6 is an explanatory diagram showing the operation of the preferred embodiment of FIG. 1.

FIGS. 1 and 6 show schematically a colour switch forming a first embodiment of the invention. Light is incident from the left side and leaves the filter on the right side.

The filter is formed as a stack of elements, and the first element 2 is a cholesteric filter CF, which has its selective reflection band in the green region of the spectrum. This filter reflects in the reflection band one circular component of incident white light. The other circular component as well as essentially all light outside the selective reflection band is transmitted by CF.

The following retarder $\lambda/4$-plate 4 in the green transforms the green circularly polarised light into linearly polarised light. This $\lambda/4$ plate as well as the following DHF LC-switch 6 SW1 (DHF=deformed helix ferroelectric) leave the unpolarised light outside the selective reflection region essentially unchanged.

The SW1 switch 6 is configured as a $\lambda/2$-plate in the green with an optical axis that can be electrically rotated by 45°. In the R or B phase the optical axis is parallel to the linear polarisation of the green light. A polariser POL1 8 is oriented such that this polarisation is blocked. If the optical axis of the SW1-switch is now rotated electro-optically by 45°, the linear green component is rotated by 90° and essentially all of this green light is transmitted through the polariser.

The elements 2–8 form a first filter section for selectively blocking green light. The remaining components R1 (10)-SW2 (12)-R2 (14)-R3 (16)-SW3 (18)-R4 (20)-POL2 (22) form a second filter section for selectively blocking blue and red light. POL2 denote a linear polariser; R1, R2, R3, and R4 are optical retarders; and SW2 and SW3 are DHF-switches. It has been found possible to suitably adapt the properties of these components to achieve a desired performance of the colour switch.

The parameters characterising the optical and electro-optical properties of these components are:
material parameters:
(i) birefringence and dispersion of the retarder material;
(ii) birefringence and dispersion, as well as their voltage dependence, of the DHF-material;
and for a given choice of the materials, the geometry may be optimised:
(iii) cell gap of the DHF-switch as well as the orientation of the optical axis in the R,G,B periods, i.e. 4

Parameters per DHF-switch (note that the effective birefringence of the DHF-switch is voltage-dependent and that the range of angles the optical axis can have is limited);

(iv) thickness and orientation of the retarders, i.e. 2 parameters per retarder; and (v) orientation of POL2 (one parameter).

The design of the first filter section is straightforward since all parameters characterising the first filter section are determined by the desired position and steepness of the filter, which position and steepness are pre-selected before other filter characteristics.

For the stack in FIG. 1 this results in 17 parameters which have to be optimised in accordance with the invention. Optimisation criteria are brightness and colour purity. This complex optimisation problem is not solvable by simple split-element considerations. It has been found that the optimum configuration depends on the choice of the importance of colour purity vs. the importance of light throughput, as well as on the range of retarder thicknesses chosen.

Figure 2:
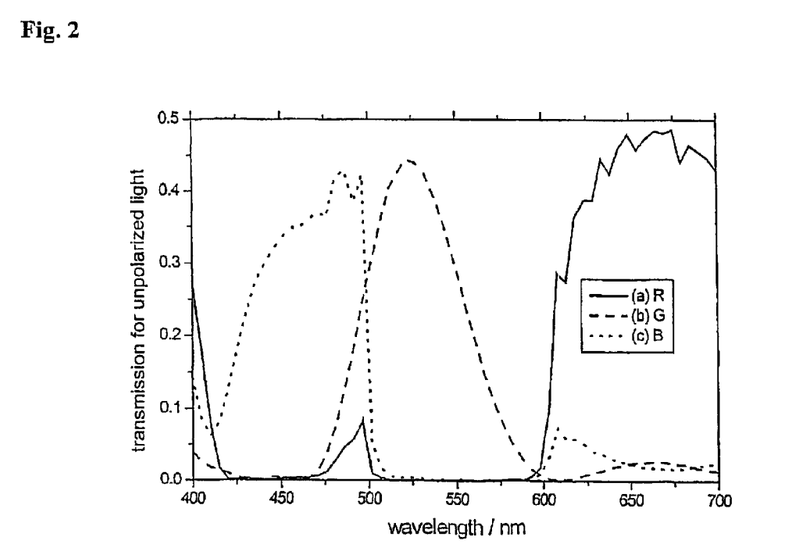
FIG. 2 is a graph showing transmissivities for the primary light components, red, green and blue of the preferred embodiment.
Figure 3:
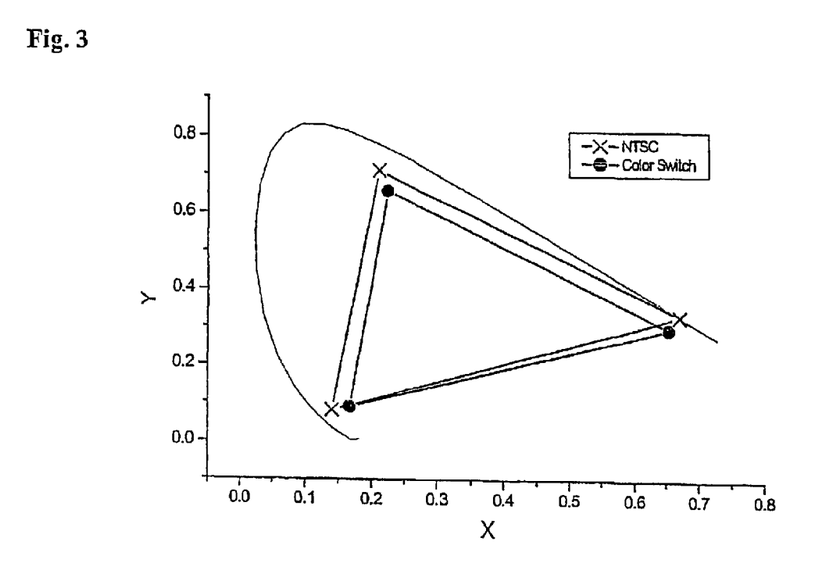
FIG. 3 is a chromaticity diagram showing the approximations provided by the preferred embodiment, to a NTSC TV system.

FIG. 2 shows examples of the transmission of an optimised configuration in the three switching states R,G,B. The high brightness (note that because of the polarizers, 0.5 is the theoretical maximum transmission) is evident, as well as the excellent colour coordinates (FIG. 3—which show the colour switch of the invention as close to the NTSC colour values).

Figure 4A:
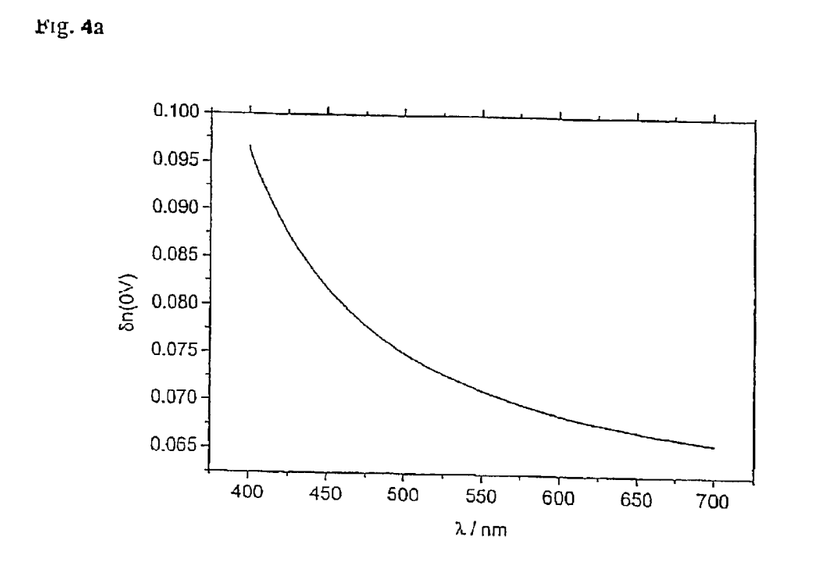
FIG. 4 are graphs of values of birefringence for switches used in the preferred embodiment.
Figure 4B:
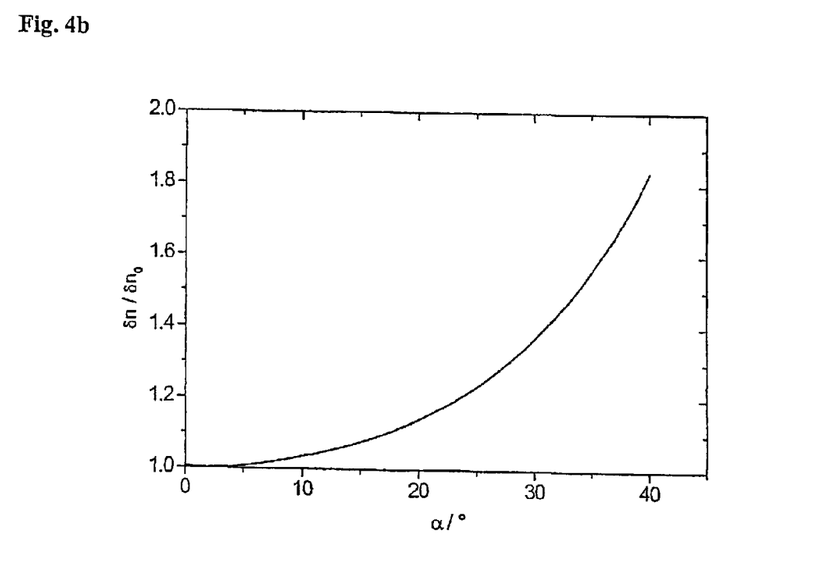
Figure 5:
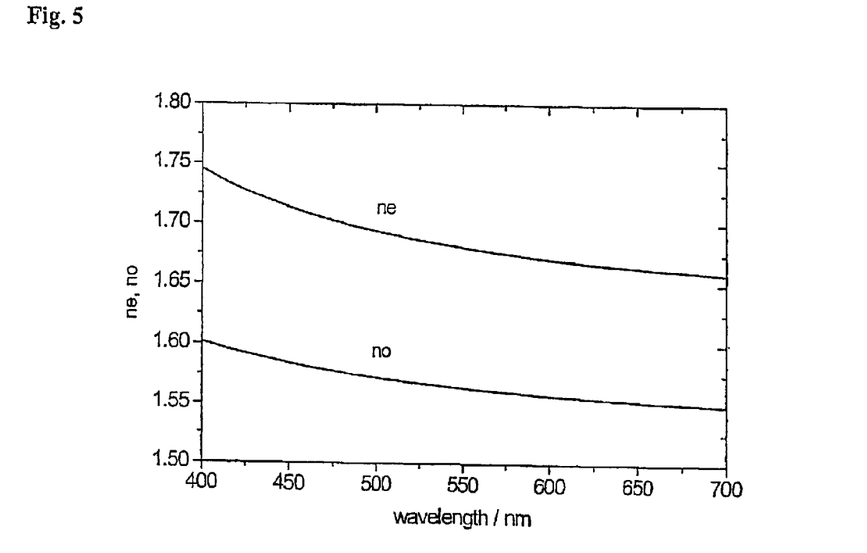
FIG. 5 is a graph showing birefringence for LCP material used in retarders and filters of the preferred embodiment.

Table I lists the parameters used in the calculations. FIG. 4a shows the birefringence data $\Delta n(\lambda)$ of the DHF-LCDs, and in FIG. 4b is shown the change of $\Delta n$ with increasing helix deformation (increasing voltage or increasing rotation angle $\alpha$ of the optical axis; see for instance J. Fünfschilling and M. Schadt, "New ferroelectric displays and operation modes," Ferroelectrics 1998, 213, p195–208, FIG. 3 in particular). Finally, FIG. 5 shows the birefringence of the LCP material used for the retarders and the cholesteric filters.

TABLE I

Parameters of the colour switch of FIG. 1

|  | R1 | SW2 | R2 | R3 | SW3 | R4 | POL2 |
|---|---|---|---|---|---|---|---|
| Thickness $d/\mu$ | 2.77 | 4.38 | 5.23 | 2.65 | 4.43 | 3.22 |  |
| Retardation $\delta n \cdot d/\mu$ @ 0 V, 550 nm | .323 | 0.312 | 0.610 | 0.310 | 0.315 | .375 |  |
| $\alpha_{RETARDER}/°$ | 48.4 |  | 85.8 | 26.5 |  | 27.6 |  |
| $\alpha_{SW,red}/°$ |  | 36.0 |  |  | 35.7 |  |  |
| $\alpha_{SW,green}/°$ |  | 42.6 |  |  | -9.3 |  |  |
| $\alpha_{SW,blue}/°$ |  | 3.9 |  |  | 16.5 |  |  |
| $\alpha_{POL2}/°$ |  |  |  |  |  |  | 58.0 | centre wavelengths of the cholesteric filters: 520, 552, 580 nm

From the data in Table I it can be seen that the sum of the retardations of the retarder elements and of the liquid crystal switches is about two micrometers, which is an astonishingly small value. This advantageously allows to make a switchable colour filter according to the invention using comparatively thin layers, which in particular show less absorption and are easier to produce, as shown the total thickness being about 23 $\mu$m. Preferably the sum of the retardations of the retarder elements and of the liquid crystal switches means is less than 5 micrometers, preferably less than 3 micrometers, and more preferably less than 2.5 micrometers.

All these birefringence data are fits to results of experiments with DHF and LCP materials. The cholesteric filter is built from three layers, each consisting of 15 windings of the cholesteric helix, with the centres of the selection bands at 520 nm, 552 nm and 580 nm. The calculations use a 4×4 matrix algorithm and simplex optimisation technique. The entrance and exit windows have antireflection coatings (modelled by a linear increase over 300 nm of the refractive index from n=1 to an average value $(n_e+n_o)/2$ of the refractive indices of the LCP). Loss-less polarisers are assumed.

In the optimisation routine the following cost function G is minimised:

1) Calculate the tristimulus-responses $(X_F, Y_F, Z_F, x_F, y_F)$ for all 3 colours F=R,G,B, assuming a white (equal energy per nm bandwidth) light source. In a real application, advantageously the spectrum of the actual light source of the projection system should be used.

2) With the data calculate $$G = \sum_{F=R,G,B} g_{1F}((x_F - x_{F0})^2 + (y_F - y_{F0})^2) + (g_{2F}(Y_F - Y_{F0}))^2$$

and minimise G by with respect to the above listed parameters. $x_{F0}$ and $y_{F0}$ denote the target values x,y for the colour co-ordinates (taken as the NTSC colour co-ordinates in our example). The target values for the brightness, $Y_{F0}$ are determined from the brightness of an ideal colour filter. This ideal filter has a transmission of 1 in a given wavelength band and falls off to 0 over 10 nm on each side. The bandwidths of the filter are chosen as wide as possible while still retaining the desired colour saturation. Note that for a specific design the actual lamp spectrum has to be employed in this calculation. The resulting brightness of the three colours of these ideal filters are used as target values for the colour switch. In our case, the values are 0.12, 0.25 and 0.05 for F=R, G, B respectively. The values of $Y_F$ should be larger than, but close to, the maximum that can be attained for each colour. Note that the maximum transmission is 0.5 due to the polarisers. The weight parameters g are chosen interactively, adjusted recursively, such that the size of corresponding terms in G after the optimisation are similar (within a factor of ten, preferably three).

A sketch illustrating the basic operation principle of the components of the colour switch for the three colour states is given in FIG. 6. In this schematic representation the directions of the optical axes of the LC-switches are depicted according to table I in the R, G and B states.

Figure 7:
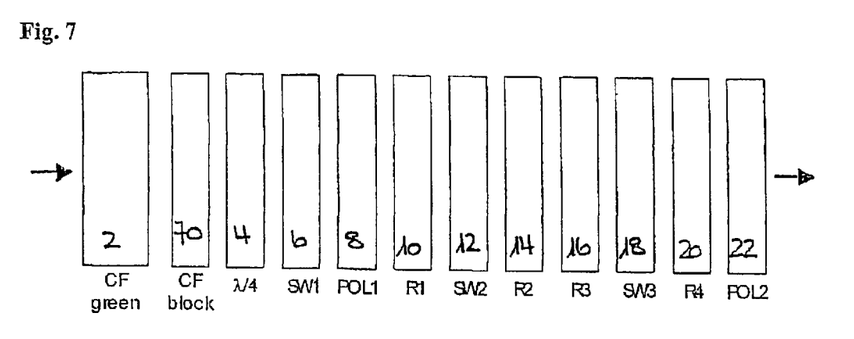
FIG. 7 is a second embodiment for the invention, modified as compared with FIG. 1.
Figure 8:
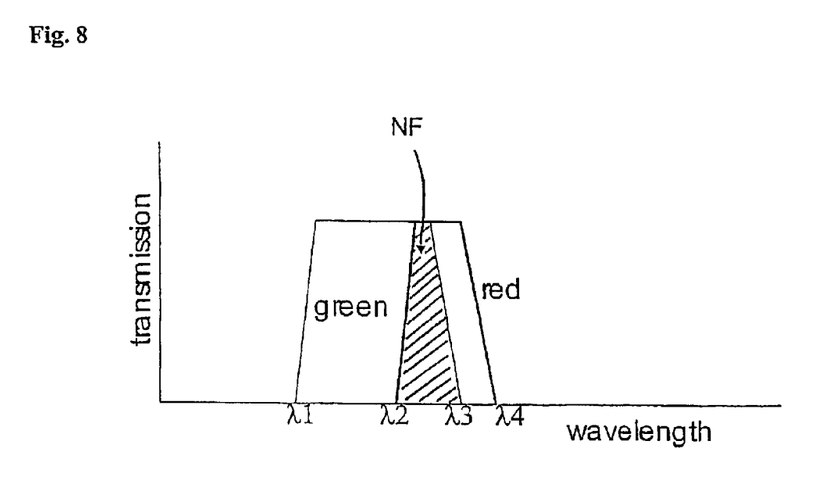
FIG. 8 is a sketch showing an aspect of the transmission characteristics of the filter of FIG. 7.

FIG. 7 shows a second embodiment of the invention, wherein similar parts to those of FIG. 1 are referred to by the same reference numerals. The difference relative to the colour switch of FIG. 1 is the additional cholesteric filter 'CF block' 70. This narrow-bandwidth ($\Delta n \approx 0.12$) filter has the opposite helix sense to the preceding 'CF green' filter 2. The effect of this filter is shown in FIG. 8. In the wavelength region $\lambda 2 \ldots \lambda 3$ (shaded region NF) the two cholesteric filters act as a blocking (notch) filter. This wavelength region is thus never transmitted, regardless of the switching states of the DHF-LCDs. Between $\lambda 3$ and $\lambda 4$ the circular polarisation opposite to the transmission of the green CF is transmitted. After the $\lambda/4$-plate this light is linearly polarised perpendicular to the polarisation of the green light between in the wavelength region $\lambda 1 \ldots \lambda 2$. Correspondingly, the light is transmitted in the non-green periods and blocked in the green period, making the green spectrum sharper by blocking unwanted red light. By this technique, selective wavelength regions (in the red as well as in the blue) can be blocked during the green period. This is important if the lamp used has strong emission lines that should be suppressed during the green period.

DHF-LCDs are well suited for these colour switches, because of their high speed switching capabilities and their analog electro-optic response. This analog response allows to switch between three states (equal duty cycle) and still employ dc-free driving voltages. This is achieved as follows:

If the calculations result in the three angles $\alpha_R$, $\alpha_G$ and $\alpha_B$ of the optical axes of the DHF-switch with the x-axis (=axis of the polariser POL1 in FIG. 1) for the three colours R, G and B, calculate $\alpha_0$ as $\alpha_0=(\alpha_R+\alpha_G+\alpha_B)/3$. Choose the orientation of the DHF-switch such that the optical axis for 0 volts applied has an angle $\alpha_0$ to the x-axis. Because of the nearly linear dependence of the rotation angle of the optical axis on the applied voltage, the sum of the three voltages corresponding to $\alpha_R$, $\alpha_G$ and $\alpha_B$ is very close to zero, i.e. for constant duty-cycle switching, the switching is essentially dc-free. If required, it is possible to incorporate into the optimisation routine a small non-linearity of the angle versus voltage relation to calculate the correction for the deviation of the DHF optical axis from $\alpha_0$. Note that a possible temperature dependence of the electro-optic response can be compensated for by the same argument with a suitable change of the driving amplitude, because the ratios of the three voltages remain constant.

However, the DHF-switches used in the configurations of FIGS. 1 and 7 may be replaced by other types of fast LCD-switches, such as electroclinic, antiferroelectric, V-shaped antiferroelectric, bistable SSF, analogue driven SSF, and also nematic switches, such as TN or Pi-cell. In each case, the above optimisation procedure has to be repeated to find the optimum configuration.

Furthermore, the configurations of FIG. 1 or 7 may be modified in a straightforward way by adding or deleting some retarders. Deleting e.g. R2 still yields satisfactory colours, after re-optimising all the other parameters.

For the first polariser POL1 and/or POL2 advantageously also a non-absorbing brightness-enhancement foil (BEF) could be used. Such foils are available from 3M and are for instance described in U.S. Pat. No. 5,962,114, J. M. Jonza et al, 3M Innovative Properties Company.

All optical parts in projection systems must tolerate extremely high light intensities with no degradation. The most critical parts are absorbing devices like sheet polarisers. In many cases, non-absorbing reflective polarisers such as polarising beam splitters (PBS's) or cholesteric filters are preferred. The configurations of FIGS. 1 and 7 have polariser POL1 inside the stack. Using a PBS polariser then sacrifices the compactness of the colour switch.

It is thus desirable to position the polariser outside of the stack. This has the additional advantage that polarisation recovery schemes can be applied for the illumination of the colour switch.

Polarisation recovery schemes utilise non-absorbing polarisers that split the unpolarised light into two beams of differently (linearly or circularly) polarised light. Several techniques have been reported (e.g. Barnik et al. U.S. Pat. No. 5,235,443, Shingaki et al. U.S. Pat. No. 5,381,278) to transform the polarisation of one of these beams into the polarisation of the other and combine them to a single beam. With such a technique, all the incoming unpolarised light is collected as polarised light of a single polarisation. Note that with all these techniques either the beam cross-section or the divergence (or both) increase.

Figure 9:
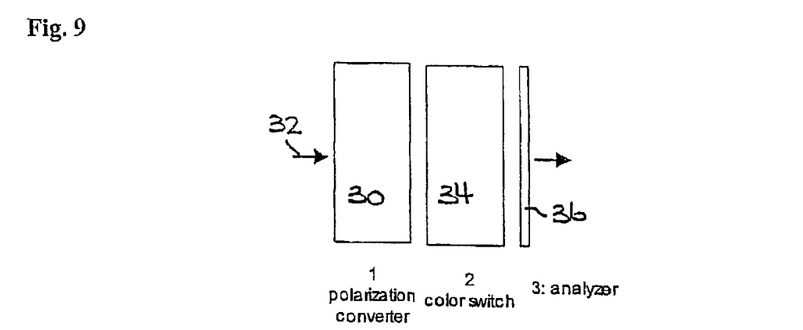
FIG. 9 is a schematic view of a colour switch with a polarisation converter and polarisation analyser positioned on either side of a stack forming the other elements of the colour switch.
Figure 10:
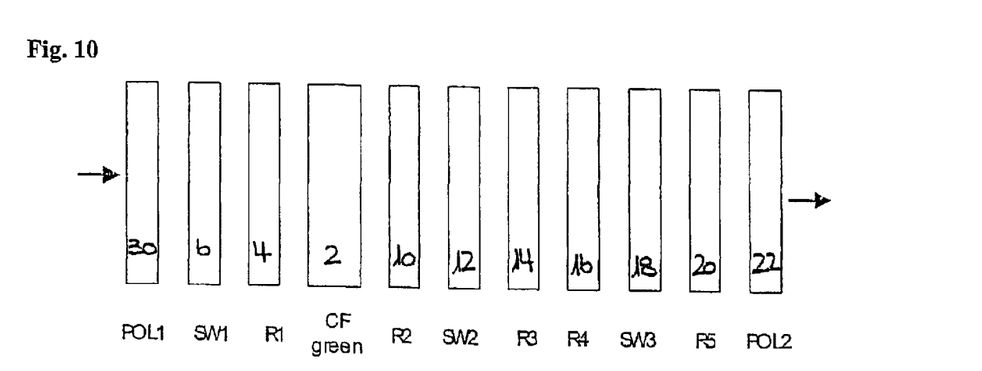
FIG. 10 is a schematic view of a third embodiment of the invention.
Figure 11:
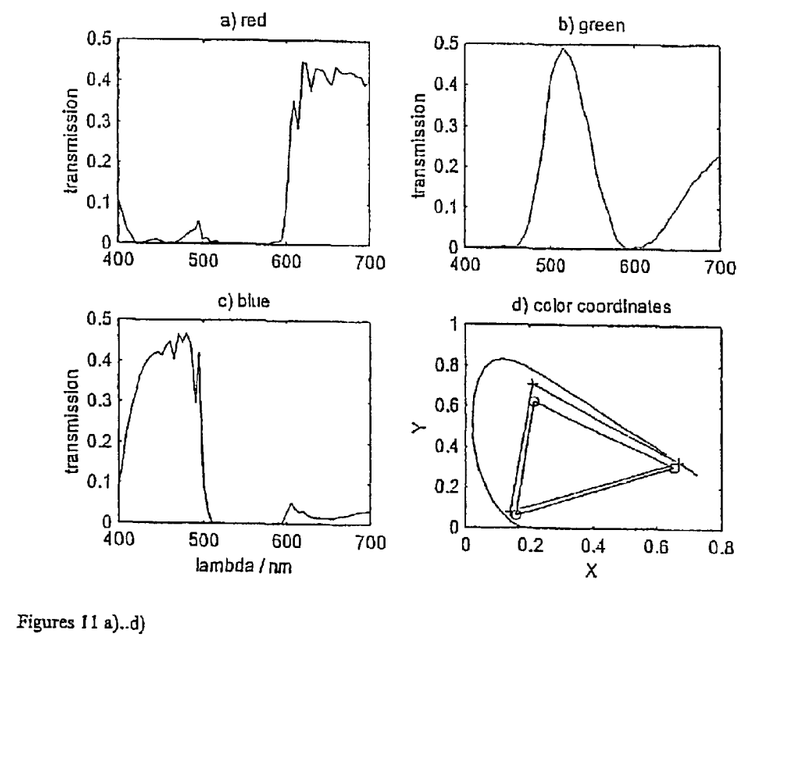
FIGS. 11a–11d are graphs showing the characteristics of the filter of FIG. 10.
Figure 12:
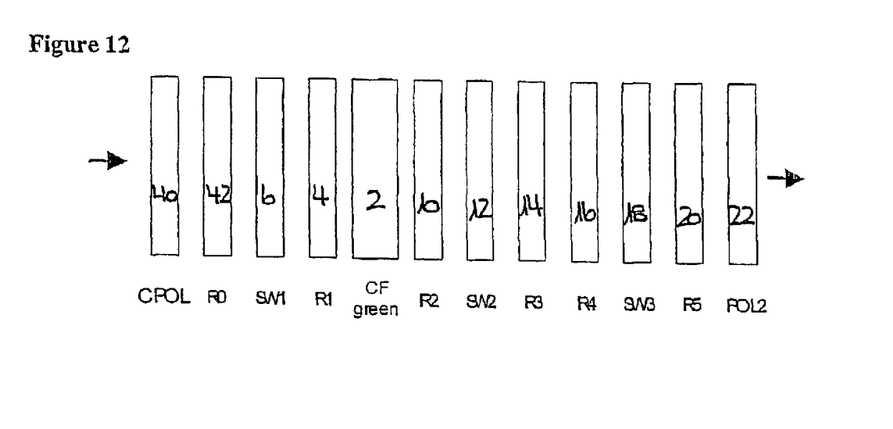
FIG. 12 is a schematic view of a fourth embodiment of the invention.
Figure 13:
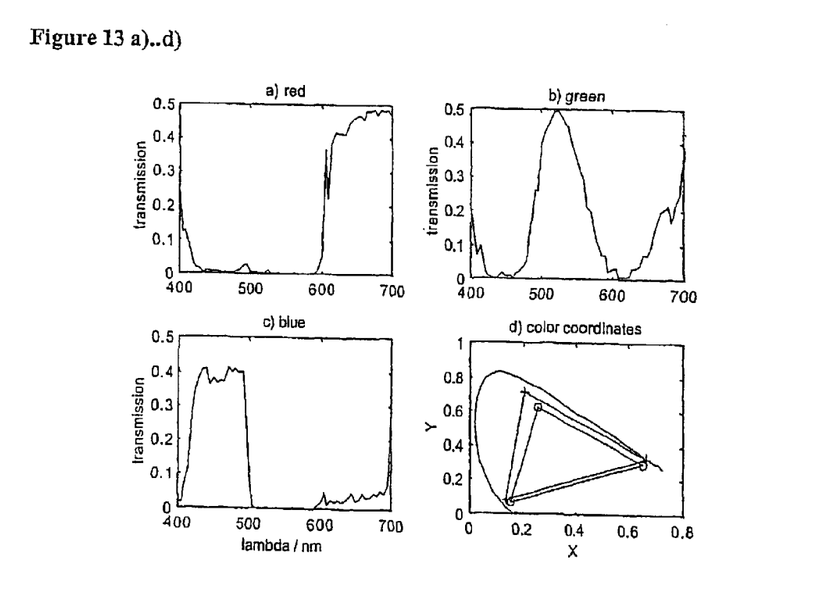
FIGS. 13a–13d are graphs showing the characteristics of the filter of FIG. 12.

FIG. 9 is a conceptual view of the embodiments of FIGS. 10 and 12 where the polarisation elements of the colour switch are extracted from the stack of switch elements and placed on either side of the stack. Thus in FIG. 9, a polarisation converter 30 receives an incident beam of radiation 32 and transmits the whole of the beam in polarised form to a stack of elements forming a colour switch 34. Light transmitted through colour switch 34 is incident on a polariser 36 which performs the function of a polarisation analyser.

Referring now to the third embodiment of the invention shown in FIG. 10, similar parts to those shown in FIG. 1 are denoted by the same reference numeral. In FIG. 10, the cholesteric filter section is changed in that the sequential order of the elements is reversed, i.e. the order in which they receive an incoming beam of radiation. In addition, the polarisation sheet 8 FIG. 1 is changed to a polariser 30 which is of a type which passes substantially all the incoming light without absorption as a polarised beam. Since such a polariser is of substantial dimensions, it is positioned outside of a stack formed by the remainder of the switch elements. The liquid crystal switch 6 receives the polarised light from polariser 30, and selectively rotates its axis. Retarder plate 4 transforms the polarised light to a circularly polarised state, and passes it to cholesteric filter 2 which transmits one circularly polarised state and reflects the other.

The second filter section comprising elements 10–22 is substantially the same as that shown in FIG. 1. It would, however, be possible to have the final analyser 22 formed as a non-absorbing polarising element, such as a PBS and to have this polariser positioned outside the stack, as conceptually indicated at 36 in FIG. 9.

The elements of the stack have been optimised by the same optimisation procedure as in the first example. The results are summarised in FIGS. 11a–11d and in Table II. As with the previous examples, the birefringence of the material of the switches is chosen corresponding to FIG. 4, and that of the retarders according to FIG. 5. Brightness and colour co-ordinates are also excellent. Notes that R2 . . . R5 have been chosen to have equal thickness to simplify the production of these colour switches. The trade-off in performance due to this constraint is small.

Instead of a linear polariser, a circular polariser can also be used (e.g. a device as shown in U.S. Pat. No. 5,235,443 mentioned above). FIG. 12 shows a corresponding colour switch—a fourth advantageous embodiment of the invention. Similar parts to those of FIG. 1 are denoted by the same reference numeral. CPOL denotes a circular polariser 40, which is modelled as a series of cholesteric filters with selective reflection bands covering the whole visible wavelength range. Also an additional retarder R0 42 has been added. FIGS. 13a–13d show the spectral characteristics calculated with the data of Table III. Again, excellent brightness and colour saturation is found. Elements 6–22 are formed as a stack of elements. In a modification, polariser 22 is replaced by a polariser similar to polariser 40.

TABLE II

| | SW1 | R1 | R2 | SW2 | R3 | R4 | SW3 | R5 | POL2 |
|---|---|---|---|---|---|---|---|---|---|
| d/μm | 2.55 | 1.18 | 4.68 | 3.36 | 4.68 | 4.68 | 3.23 | 4.68 | |
| $\alpha_R/°$ | | 45 | 59.1 | | −37.3 | 18.8 | | −81.4 | |
| $\alpha_{SW,1}/°$ | 0 | | | −90.8 | | | −58.7 | | |
| $\alpha_{SW,2}/°$ | −45 | | | −56.4 | | | −29.9 | | |
| $\alpha_{SW,3}/°$ | 0 | | | −60.5 | | | −69.1 | | |
| $\alpha_{POL}/°$ | | | | | | | | | 90 |

TABLE III

| | R0 | SW1 | R1 | R2 | SW2 | R3 | R4 | SW3 | R5 | POL2 |
|---|---|---|---|---|---|---|---|---|---|---|
| d/μm | 1.18 | 2.93 | 1.18 | 4.70 | 3.56 | 4.70 | 4.70 | 3.56 | 4.70 | |
| $\alpha_R/°$ | 45 | | 45 | 57.5 | | -21.5 | 31.7 | | -86.9 | |
| $\alpha_{SW,1}/°$ | | 0 | | | -93.4 | | | -59.9 | | |
| $\alpha_{SW,2}/°$ | | -42.5 | | | -57.0 | | | -28.7 | | |
| $\alpha_{SW,3}/°$ | | 0 | | | -63.0 | | | -69.1 | | |
| $\alpha_{POL}/°$ | | | | | | | | | | 90 |

What is claimed is:

1. A colour filter for switching between three different colour bands, the colour filter comprising a first filter section for selectively blocking a first colour band and a second filter section for selectively blocking second and third colour bands, wherein:
   the first filter section includes a chiral filter means for reflecting one circularly polarised state of the first colour band and transmitting the other circularly polarised state; and
   the second filter section includes a combination of a plurality of retarder elements and a plurality of electrically controlled liquid crystal switches arranged so as to be switchable between a first state in which both the second and third colour bands are blocked and the first colour band is transmitted, a second state in which the second colour band is blocked and the third colour band is transmitted, and a third state in which the third colour band is blocked and the second colour band is transmitted.

2. A colour filter according to claim 1, wherein the first filter section includes a quarter wave plate for transforming said transmitted circularly polarised state to linearly polarised light, a liquid crystal switch configured as a half wave plate for the first colour band and having an optical axis that can be electrically rotated for switching the linearly polarised tight, and a linear polarising element.

3. A colour filter according to claim 1, wherein the first filter section includes a quarter wave plate and a liquid crystal switch which in one electro-optic state acts as a half wave plate for the first colour band and in another electro-optic state does not exhibit birefringence.

4. A colour filter according to claim 1, wherein the first filter section includes a blocking filter for blocking a wavelength range between the first colour band and an adjacent second or third colour band.

5. A colour filter according to claim 1, wherein the first colour band occupies a wavelength range between the second and third colour bands.

6. A colour filter according to claim 1, wherein the colour filter is configured as a stack of filter elements, and wherein the first filter section is positioned in front of the second filter section to receive incoming light.

7. A colour filter according to claim 1, said first filter section including linear polarising means positioned to receive incident radiation and to transmit polarised radiation to a liquid crystal switch, the liquid crystal switch selectively rotating the axis of the radiation for reception by a retarder means which in turn passes radiation to said chiral filter means.

8. A colour filter according to claim 7, wherein the linear polarising means includes means for converting substantially all the incoming radiation to a polarised form in a wavelength region of interest.

9. A colour filter according to claim 7 or 8, wherein the colour filter is configured as a stack of filter elements, and wherein the first filter section is positioned in front of the second filter section to receive incoming light, and wherein said linear polarising means is formed separately from said stack of filtered elements.

10. A colour filter according to claim 7, wherein the linear polarising means is formed as a circularly polarising means and including a following retarder means for converting circularly polarised radiation to linearly polarised radiation.

11. A colour filter according to claim 1, wherein the second filter section comprises, in sequence, a first retarder element, a first liquid crystal switch means, a second retarder element, a second liquid crystal switch, and a linearly polarising element.

12. A colour filter according claim 11, including a third retarder element between said second retarder element and the second liquid crystal switch.

13. A colour filter according to claim 12, including a fourth retarder element disposed behind said second liquid crystal switch.

14. A colour filter according to claim 1, wherein at least one of the aforementioned liquid crystal switches has at least three different electro-optic states.

15. A colour filter according to claim 1, wherein at least one of the aforementioned liquid crystal switches are selected from the group comprising: a Deformed Helical Ferroelectric (DHF) switch, a electro-clinic switch, a V-shaped anti-ferro electric switch, a Pi-cell switch, and a SSF switch.

16. A colour filter according to claim 1, wherein at least one of the liquid crystal switches is a Deformed Helical Ferroelectric (DHF) switch.

17. A colour filter according to claim 1, wherein the second filter section is such that the sum of the retardations of the retarder elements and of the plurality of liquid crystal switches is less than approximately 5 micrometers.

18. A colour filter according to claim 1, wherein the retardations and orientations of the retarder elements and liquid crystal switches of the second filter section have been selected by minimising a cost function that uses weights yielding substantially similar terms describing the deviations of colour saturation and brightness from desired values.

19. A colour filter according to claim 1, wherein the liquid crystal of at least one of the elements comprising a liquid crystal is aligned by a photo-orientation technique.

20. A colour filter according to claim 1, wherein the second filter section is such that the sum of the retardations of the retarder elements and of the plurality of liquid crystal switches is less than approximately 3 micrometers.

21. A colour filter according to claim 1, wherein the second filter section is such that the sum of the retardations of the retarder elements and of the plurality of liquid crystal switches is less than approximately 2.5 micrometers.

* * * * *